F. H. SNYDER.
SNUBBER.
APPLICATION FILED DEC. 28, 1918.
1,325,121. Patented Dec. 16, 1919.
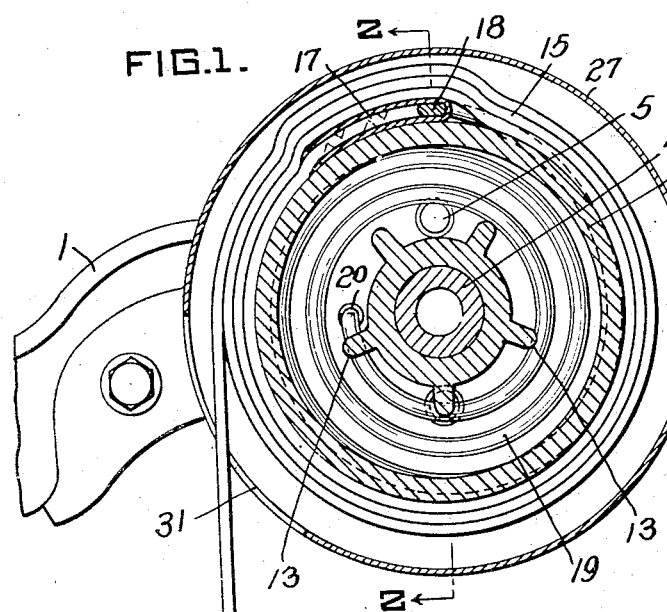
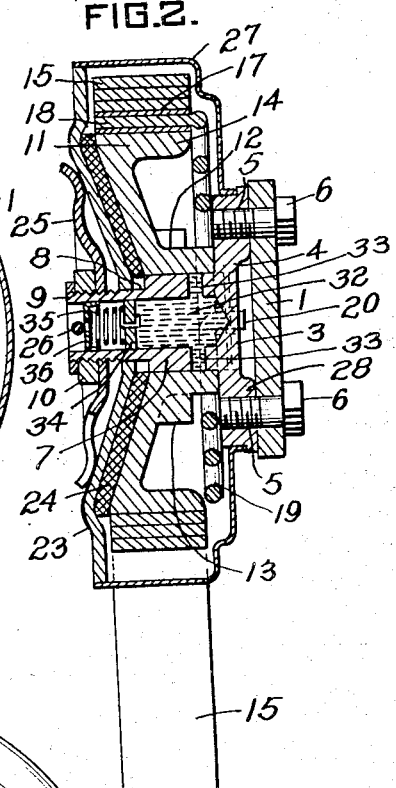
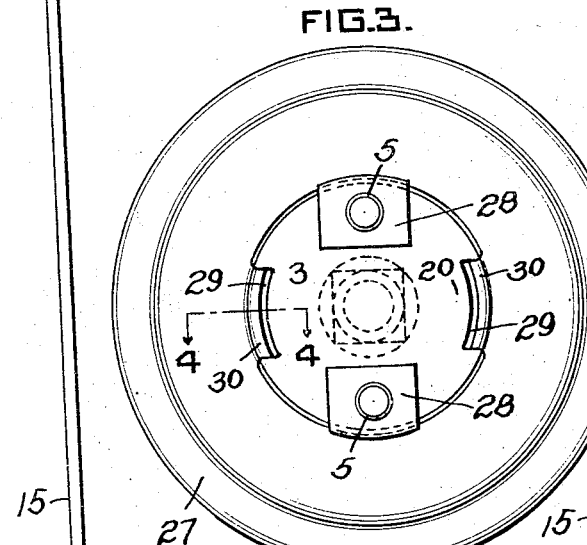
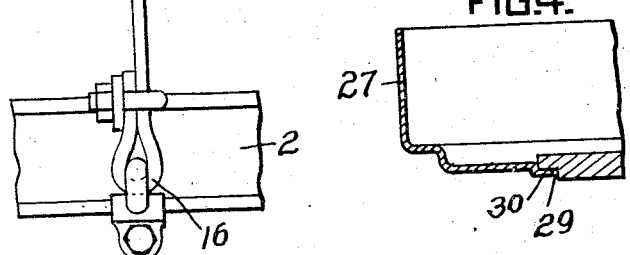
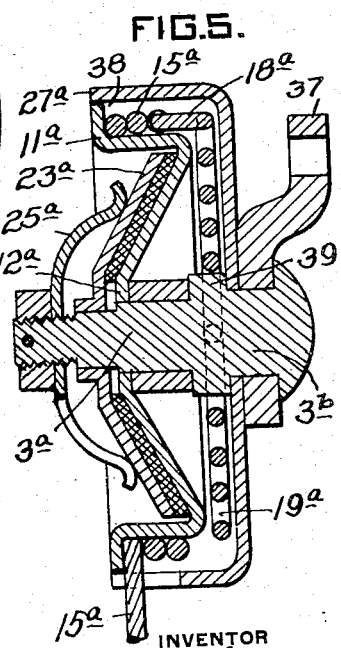
WITNESSES
J. Herbert Bradley.
INVENTOR
Ferdinand H. Snyder.
By Fred'k W. Winter
Attorney

UNITED STATES PATENT OFFICE.

FERDINAND H. SNYDER, OF SHENANDOAH JUNCTION, WEST VIRGINIA.

SNUBBER.

1,325,121.   Specification of Letters Patent.   Patented Dec. 16, 1919.

Application filed December 28, 1918. Serial No. 268,767.

*To all whom it may concern:*

Be it known that I, FERDINAND H. SNYDER, a resident of Shenandoah Junction, in the county of Jefferson and State of West Virginia, have invented a new and useful Improvement in Snubbers, of which the following is a specification.

This invention relates to snubbing devices for preventing sudden or excessive movement between two bodies, such, for instance, as restraining the rebound of automobile bodies.

The object of the invention is to provide a simple and compact device of this kind whereby the degree of snubbing can be varied to suit conditions or to take up wear of parts or fatigue of springs, and also one in which the flexible connecting member is not subjected to friction and wear.

In the accompanying drawings Figure 1 is a central longitudinal sectional view through the drum of the device; Fig. 2 is a transverse section taken on the line 2—2, Fig. 1; Fig. 3 is a rear elevation of the device; Fig. 4 is a detail sectional view on the line 4—4, Fig. 3; and Fig. 5 is a sectional view corresponding to Fig. 2 showing a modification.

In the drawing 1 indicates a portion of the frame of an automobile body whose movement is to be restrained, and 2 a portion of the axle or running gear of said vehicle. 3 indicates a stationary journal member, the same having a flange 4 on which are oppositely disposed thickened portions provided with threaded holes 5 for receiving tap bolts 6 or the like for securing the journal member body to the member 1, and having beyond the outwardly projecting journal portion 7 a reduced portion 8 of non-circular form, such as square, hexagonal or the like, and on the outer end being threaded, as at 9, to receive the nut 10. Rotatable on the journal 7 is a drum 11 comprising a hub 12, a web and a rim 14. Coiled two or more times on said drum, but unattached thereto is a rotatable flexible connecting member 15, shown in Figs. 1 and 2 as a flat band or belting, and which at its outer end is connected by a suitable coupling 16 to the axle 2 or other portion of the running gear of the vehicle. The inner end of this flexible connecting member is secured by suitable means, such as the clip 17, to an arm 18 formed on the outer end of a spiral spring 19, the coils of which lie in a common plane at the rear face of the drum 11, and having its inner end suitably attached to the journal member 3, such as by bending the end of said spring to a right angle, as shown at 20, and inserting the same in a hole in the flange 4 of said journal. To prevent the end of the spring from springing out of the hole, a number of projections 13 are provided on the hub 12 of the drum and extending into proximity of the plane of the spring 19.

Fitted on the non-circular portion 8 of the journal member, so as to be non-rotatable thereon, is a friction plate 23 of a contour conforming to that of the outer face of the drum, and in operative frictional engagement therewith. Preferably a friction disk 24, of suitable fibrous material, is interposed between the friction plate 23 and the outer face of the drum. This friction disk may be attached to either of said parts or may be loose, as desired. Bearing against the outer face of the friction plate 23 is a suitable spring washer 25, preferably of star shape and which is held in position and can have its tension adjusted by means of the nut 10 which is held against rotation by a cotter pin 26. The drum is inclosed and housed by a pressed metal casing 27, the forward edge of which closely fits the perimeter of friction plate 23, and its opposite edge having a close fit on the periphery of the flange 4 of the journal member 3. At diametrically opposite portions the flange 4 is provided with outwardly projecting lugs 28 which prevent displacement of the casing in that direction, and at two other diametrically opposite points said flange is provided with thin portions 29 over which the edge portions 30 of the casing are crimped and which therefore prevent movement of the case in the opposite direction. The casing is provided on its periphery with an opening 31 through which the flexible connecting member 15 passes.

In order to lubricate the drum from the journal 7, said journal is bored out centrally to provide a chamber 32 to receive a suitable lubricant and which chamber communicates with the outer face of the journal through cross bores 33. Fitting in the central bore and bearing against the lubricant is a suitable follower 34 which is pressed inwardly by means of a light helical spring 35 interposed between the outer face of the follower and a cup-shaped retainer 36 which is held in position by the cotter 26. In this way the lubricant is kept under a constant light pressure to insure thorough lubrication of the journal upon which the drum rotates.

All of the parts of the device are thoroughly housed, and are of compact form and compact assemblage.

In the use of the device, when there is a rebound of the vehicle body the tension on the flexible member 15 causes it to grip the drum and rotate it against the friction exerted by the friction plate 23, and this friction can be varied by adjusting the nut 10, so as to secure any desired degree of checking of the rebound.

Furthermore in case the flexible member 15 should stretch, or the parts should wear, the loss can be compensated for by adjusting the nut 10 so as to restore the desired friction. As the drum rotates, the outer end of the spiral spring is pulled by the flexible member 15, thus tending to coil or wind up said spiral spring to closer formation and putting the same under increased tension. As soon as the strain in the member 15 is released, its grip on the drum is also released and the spiral spring reacts to normal position and pulls the coils of the flexible member around the drum back to its original position, said flexible connector sliding on the peripheral face of the drum during this movement. This, however, is the only sliding movement of the flexible connector, as upon the reverse movement thereof the drum is caused to rotate and said flexible conductor unwinds therefrom. Consequently no frictional wear is imposed upon the flexible connector, as the only sliding movement occurs when there is no strain on said flexible connector.

Fig. 5 shows a modification in which the journal member 3ª has a square or other non-circular portion 3ᵇ for receiving the member 37 for attaching it to the vehicle frame. The drum 11ª in this design is formed of pressed metal, having the pressed web and rim portions, with a machined hub portion 12ª secured thereto. The friction plate 23ª and spring washer 25ª are of slightly different form than in Figs. 1 to 4, but function exactly as in the main design. The flexible connector 15ª in this modification, instead of being a flat band, is of rope or cable form and has its inner end suitably connected to the arm 18ª of the spiral spring 19ª, exactly as in the main design. The casing or housing 27ª is of somewhat different shape than that shown in the other figures, but serves exactly the same function, this housing being of a size to permit the drum to rotate therein by providing sufficient clearance at the point 38, and is held in position between an internal collar 39 on the member 3ª and the external member 37. It functions however exactly as the main form.

The device described is compact and of simple construction and provides for an adjustable friction, so as to vary the amount of friction as desired and also to compensate for wear of the parts or elongation of the flexible connecting member. The flexible connecting member is not subjected to any frictional wear and therefore is of long life.

I claim:

1. In a snubber, the combination of a rotatable drum, a flexible connecting member coiled thereon and circumferentially slidable thereon, and means to maintain tension on the inner end of said flexible member, whereby when said flexible member is pulled outwardly it grips and rotates said drum and when the outward pull is relieved the grip of said flexible member on the drum is released to permit the retraction of the flexible member.

2. In a snubber, the combination of a rotatable drum, means to apply a variable friction thereto, a flexible connecting member coiled on said drum and circumferentially slidable thereon, and means to maintain tension on the inner end of said flexible member whereby when said flexible member is pulled outwardly it grips and rotates said drum and when the outward pull is relieved the grip of said flexible member on the drum is released to permit the retraction of said flexible member.

3. In a snubber, the combination of a rotatable drum, a friction member in contact with said drum, means to adjust the pressure of said friction member, a flexible connecting member coiled on said drum and circumferentially slidable thereon, and means to maintain tension on the inner end of said flexible member, whereby when said flexible member is pulled outwardly it grips and rotates said drum and when the outward pull is relieved the grip of said flexible member on the drum is released to permit retraction of the flexible member.

4. In a snubber, the combination of a rotatable drum, a flexible connecting member coiled thereon, and a spring having one end attached to the inner end of said flexible member and its other end to a stationary part, whereby when said flexible member is pulled outwardly it grips and rotates said drum and when the outward pull is relieved the grip of said flexible member on the drum is released to permit said spring to retract the flexible member.

5. In a snubber, the combination of a rotatable drum, means for applying friction thereto, a flexible connecting member coiled on said drum, and a spring whose end is attached to the inner end of said flexible member and its other end to a stationary part, whereby when said flexible member is pulled outwardly it grips and rotates said drum and when the outward pull is relieved the grip of said flexible member on the drum is released to permit said spring to retract the flexible member.

6. In a snubber, the combination of a rotatable drum, a nonrotatable friction plate operatively associated with said drum, a flexible connecting member coiled on said drum and circumferentially slidable thereon, and means to maintain tension on the inner end of said flexible member, whereby when said flexible member is pulled outwardly it grips and rotates said drum and when the outward pull is relieved the grip of said flexible member on the drum is released to permit retraction of the flexible member.

7. In a snubber, the combination of a rotatable drum, a nonrotatable friction plate operatively associated with said drum, a flexible connecting member coiled on said drum, and a spring having its one end attached to the inner end of said flexible member and its other end to a stationary part, whereby when said flexible member is pulled outwardly it grips and rotates said drum and when the outward pull is relieved the grip of said flexible member on the drum is released to permit said spring to retract the flexible member.

8. In a snubber, the combination of a stationary journal, a drum rotatable thereon, a friction plate nonrotatably secured to said journal and operatively associated with said drum, a flexible connecting member coiled on said drum and circumferentially slidable thereon, and means to maintain tension on the inner end of said flexible member, whereby when said flexible member is pulled outwardly it grips and rotates said drum and when the outward pull is relieved the grip of said flexible member on the drum is released to permit said tension means to retract the flexible member.

9. In a snubber, the combination of a stationary journal, a drum rotatable thereon, a friction plate nonrotatably secured to said journal and operatively associated with said drum, a flexible connecting member coiled on said drum, and a spring having one end attached to said journal and the other end to the inner end of said flexible member, whereby when said flexible member is pulled outwardly it grips and rotates said drum and when the outward pull is relieved the grip of said flexible member on the drum is released to permit said spring to retract the flexible member.

10. In a snubber, the combination of a stationary journal, a drum rotatable thereon, a friction plate secured to said journal and operatively associated with said drum, a flexible connecting member coiled on said drum, a coiled spring having one end secured to said journal and its opposite end connected to the inner end of said flexible member, and a casing secured to the journal and inclosing said spring, said drum and the portion of the flexible member coiled thereon.

In testimony whereof, I have hereunto set my hand.

FERDINAND H. SNYDER.

Witnesses:
H. C. MARTEN,
JAS. S. RIGHTSTINE.